Dec. 28, 1926.

A. W. GRAY

FEED AGITATOR

Original Filed June 18, 1926  2 Sheets-Sheet 1

1,612,009

Inventor

A. W. Gray,

By Clarence A O'Brien

Attorney

Dec. 28, 1926.
1,612,009
A. W. GRAY
FEED AGITATOR
Original Filed June 18, 1926   2 Sheets-Sheet 2

Inventor
A. W. Gray,
By Clarence A. O'Brien
Attorney

Patented Dec. 28, 1926.

1,612,009

UNITED STATES PATENT OFFICE.

ALBERT W. GRAY, OF ELDORA, IOWA.

FEED AGITATOR.

Original application filed June 18, 1926, Serial No. 116,874. Divided and this application filed October 21, 1926. Serial No. 143,212.

The present invention relates to a feed agitator, particularly designed for a hopper in a potato planter such as is shown in my pending application relating to seed potato cutters, Serial No. 116,874, filed June 18, 1926, and the subject matter of this present invention has been divided from said application.

An important object of the invention is to provide a device of this character with a view to compactness and in which the number of parts are few, the construction simple, and the cost of production low.

Another very important object of the invention lies in the provision of a device of this nature which is exceedingly efficient and reliable in operation and well adapted to the purpose for which it is designed.

With the above and numerous other objects in view, the invention consists in the construction, combination, and arrangement of parts as will be hereinafter more fully described, illustrated in the accompanying drawings, and pointed out in the claims hereunto appended.

Figure 1:
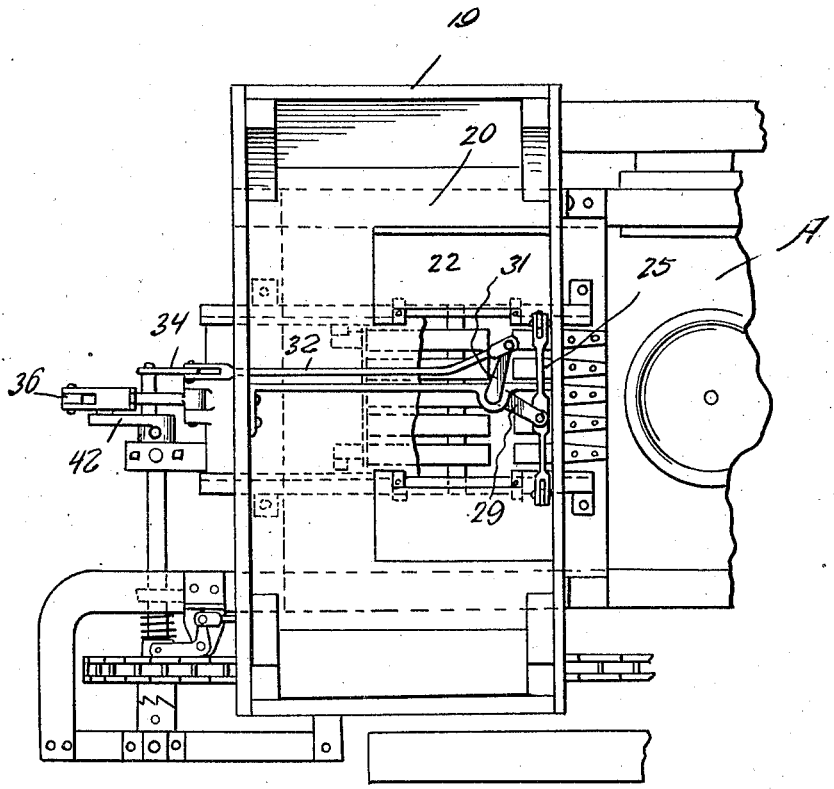
Figure 1 is a fragmentary top plan view of a seed potato cutter such as is shown in said copending application, with my improved structure illustrated.
Figure 4:
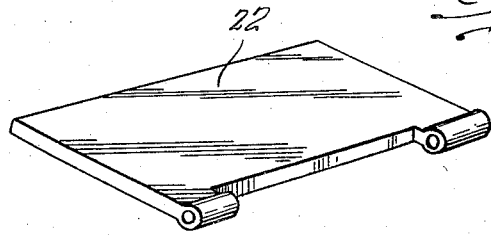
Figure 4 is a perspective view of one of the agitator plates.
Figure 2:
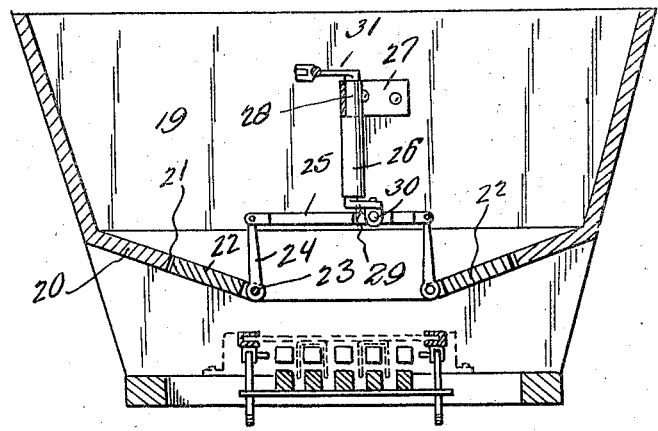
Figure 2 is a vertical section through the hopper thereof.
Figure 3:
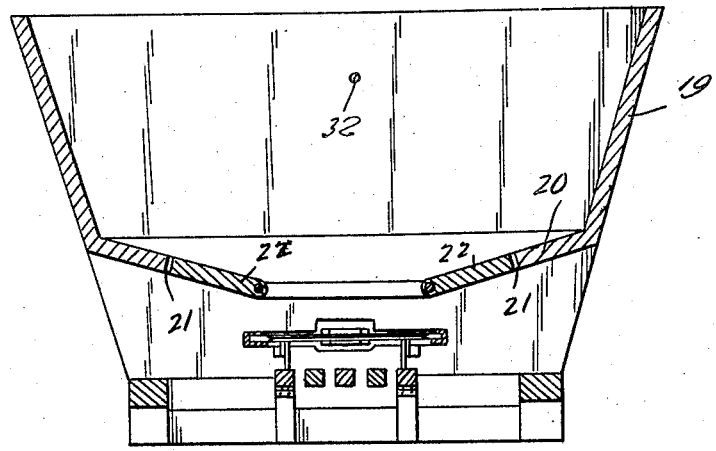
Figure 3 is another vertical section through the hopper.

Referring to the drawing in detail it will be seen that the letter A denotes generally the seed potato cutter which has mounted thereon a hopper 19, in the present instance adapted to receive whole seed potatoes. The bottoms 20 of the hopper 19 are slanted inwardly and downwardly and having openings 21 in which are swingably mounted agitator plates 22 carried on shafts 23 journaled in the hopper. Cranks 24 are joined to the shafts 23 and are connected to each other by a link 25. A bearing 26 is mounted on a bracket 27 in the hopper 19 and suitably supports a vertical shaft 28 having a crank 29 at its bottom end engaged with an intermediate portion of the link 25 as at 30, and a crank 31 at its upper end engages with a connecting rod 32. A lever 34 is rockably mounted on the rear side of the hopper 19 in any suitable manner. This lever may be operated in any suitable manner illustrated and explained in my copending application.

Having thus described the invention, what I claim as new and desire to secure by Letters Patent is:—

1. In a device of the class described, a hopper, a pair of agitating plates rockably mounted in the bottom of the hopper, cranks extending from the plates, a link connecting the cranks, a vertical bearing in the hopper, a shaft rockable in the vertical bearing and having a crank at its lower end engaged with the link, and a crank at its upper end, and means for imparting oscillation to the upper crank.

2. An agitating mechanism of the class described including, in combination, a pair of agitating plates, means for rockably mounting the agitating plates, cranks extending from the plates, a link connecting the cranks, a vertical bearing, means for mounting the vertical bearing, a shaft rockable in the vertical bearing and having a crank at its lower end engaged with the link, and a crank at its upper end, and means for imparting oscillation to the upper crank.

In testimony whereof I affix my signature.

ALBERT W. GRAY.